(12) United States Patent
Kobayashi

(10) Patent No.: US 8,251,618 B2
(45) Date of Patent: Aug. 28, 2012

(54) CUTTING INSERT, CUTTING TOOL, AND CUTTING METHOD USING CUTTING TOOL

(75) Inventor: Youji Kobayashi, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/130,545

(22) PCT Filed: Nov. 24, 2009

(86) PCT No.: PCT/JP2009/069809
§ 371 (c)(1),
(2), (4) Date: May 20, 2011

(87) PCT Pub. No.: WO2010/058856
PCT Pub. Date: May 27, 2010

(65) Prior Publication Data
US 2011/0229279 A1 Sep. 22, 2011

(51) Int. Cl.
*B23B 27/22* (2006.01)
*B23B 27/00* (2006.01)
(52) U.S. Cl. ........................ 407/115; 407/114
(58) Field of Classification Search ................ 407/113, 407/114, 115, 116
See application file for complete search history.

(56) References Cited

U.S. PATENT DOCUMENTS

| | | | | |
|---|---|---|---|---|
| 5,044,839 A | * | 9/1991 | Takahashi | 407/114 |
| 5,193,947 A | | 3/1993 | Bernadic | |
| 5,449,255 A | * | 9/1995 | Katbi et al. | 407/114 |
| 5,897,272 A | * | 4/1999 | Wiman et al. | 407/114 |
| 6,234,726 B1 | * | 5/2001 | Okada et al. | 407/114 |
| 7,488,143 B2 | * | 2/2009 | Muren et al. | 407/113 |
| 7,976,251 B2 | * | 7/2011 | Iyori et al. | 407/114 |
| 2008/0219784 A1 | | 9/2008 | Yamazaki et al. | |

FOREIGN PATENT DOCUMENTS

| | | |
|---|---|---|
| JP | 5-104310 | 4/1993 |
| JP | 8-11008 | 1/1996 |
| JP | 10-217008 | 8/1998 |
| JP | 10-328911 | 12/1998 |
| JP | 2004-106150 | 4/2004 |
| JP | 2006-110666 | 4/2006 |
| JP | 2006-110667 | 4/2006 |
| JP | 2008-213122 | 3/2007 |

OTHER PUBLICATIONS

English translation of International Search Report issued in PCT/JP2009/069809 dated Jan. 6, 2010.

* cited by examiner

*Primary Examiner* — Will Fridie, Jr.
(74) *Attorney, Agent, or Firm* — Schlee IP International, P.C.; Alexander R. Schlee (57) ABSTRACT

A cutting insert includes upper, a lower, and side surfaces a corner cutting edge and a first cutting edge; a rake surface; and a protruding portion. The protruding portion is located inner side on the upper surface with respect to the rake face and comprises a first surface, a second surface, and a third surface located between the first surface and the second surface. The rake face includes a first rake face and a second rake face. An angle between an intersection line of the third surface and the second rake face and the first side is 90 degree or less as viewed from the upper surface.

17 Claims, 12 Drawing Sheets

A-A section (40/1)

Figure 5(b)

B-B section (40/1)

A-A section (40/1)

Figure 9(b)

B-B section (40/1)

Figure 9(c)

C-C section (40/1)

CUTTING INSERT, CUTTING TOOL, AND CUTTING METHOD USING CUTTING TOOL

CROSS-REFERENCE TO RELATED APPLICATION

This application is a national phase of the International Patent Application PCT/JP2009/069809 filed on Nov. 24, 2009 that claims the priority from the Japanese patent application 2008-297771 dated Nov. 21, 2008.

BACKGROUND OF THE INVENTION

The present invention relates to cutting inserts, cutting tools and cutting methods using the same.

A cutting tool for machining a work made of metals and the like comprises a holder and a cutting insert attached to the holder.

The cutting insert disclosed in Patent Document 1 comprises a corner edge that is located between two sides constituting an upper surface thereof, and a first breaker wall and a second breaker wall on the inner side thereof. The first breaker wall is disposed in the vicinity of the corner edge, and is inclined upward as approaching inward from the corner edge. The second breaker wall is located inward and upward with respect to the first breaker wall, and is inclined upward as approaching inward from the corner edge.

In addition, a first flat surface is provided between the first breaker wall and the second breaker wall. The intersection portion of the first breaker wall and the first flat surface is inclined upward as it moves away from the corner edge.

Patent Document 1: Japanese Patent Laid Open Publication No. 2006-110666.

However, when the above-described cutting insert generates chips under cutting conditions having a large cutting depth (high cut machining), there is a concern that chips has a roughly high cutting resistance at a position far away from the corner section since the chips come in contact with the first breaker wall with great force even at a position far away from the corner edge. Furthermore, there is another concern that the chips are not curled in a stable manner under cutting conditions having a large cutting depth and are clogged between the cutting edge that is located on the side adjacent to a corner edge, or the corner edge, and a projecting section of the first and the second breaker walls.

SUMMARY OF THE INVENTION

Therefore, there is a need for a cutting insert that demonstrates good chip-discharging properties under a wide range of cutting conditions.

According to an embodiment of the present invention, a cutting insert comprises: an insert body comprising an upper surface, a lower surface and a side surface intersecting with the upper surface and the lower surface; a cutting edge comprising a corner cutting edge located at an intersection of the upper surface and the side surface and located at a corner section of first and second sides which constitute the upper surface, and a first cutting edge located at the first side; a rake face located along the cutting edge on the upper surface; and a protruding portion located inner side on the upper surface with respect to the rake face. The protruding portion comprises a first surface inclined upward as approaching from the cutting edge to inside; a second surface located on a higher location with respect to the first surface and on the inner side with respect to the first surface based on a corner cutting edge, and inclined upward as approaching from the cutting edge to inside; and a third surface located between the first surface and the second surface. An intersection portion of the first surface and the third surface is inclined downward as moving away from the corner cutting edge.

According to an embodiment of the present invention, a cutting tool comprises: the above-mentioned cutting insert and a holder comprising the cutting insert attached thereto.

According to an embodiment of the present invention, a cutting method comprises steps of: rotating a work; and bringing the cutting edge of the above-mentioned cutting tool in contact with a surface of the rotating work.

A cutting insert and a cutting tool according to embodiments of the present invention can demonstrate good chip-discharging properties under a wide range of cutting conditions.

In addition, in the cutting method according to an embodiment of the present invention, the high cutting accuracy can be achieved, and therefore, a product with high finished-surface accuracy can be obtained.

DETAILED DESCRIPTION OF THE DRAWINGS

<Cutting Insert>(First Embodiment)

With reference to FIGS. 1 to 5, a cutting insert 1 according to a first embodiment of the present invention (hereinafter referred to as an insert 1) is described in detail.

Figure 1:
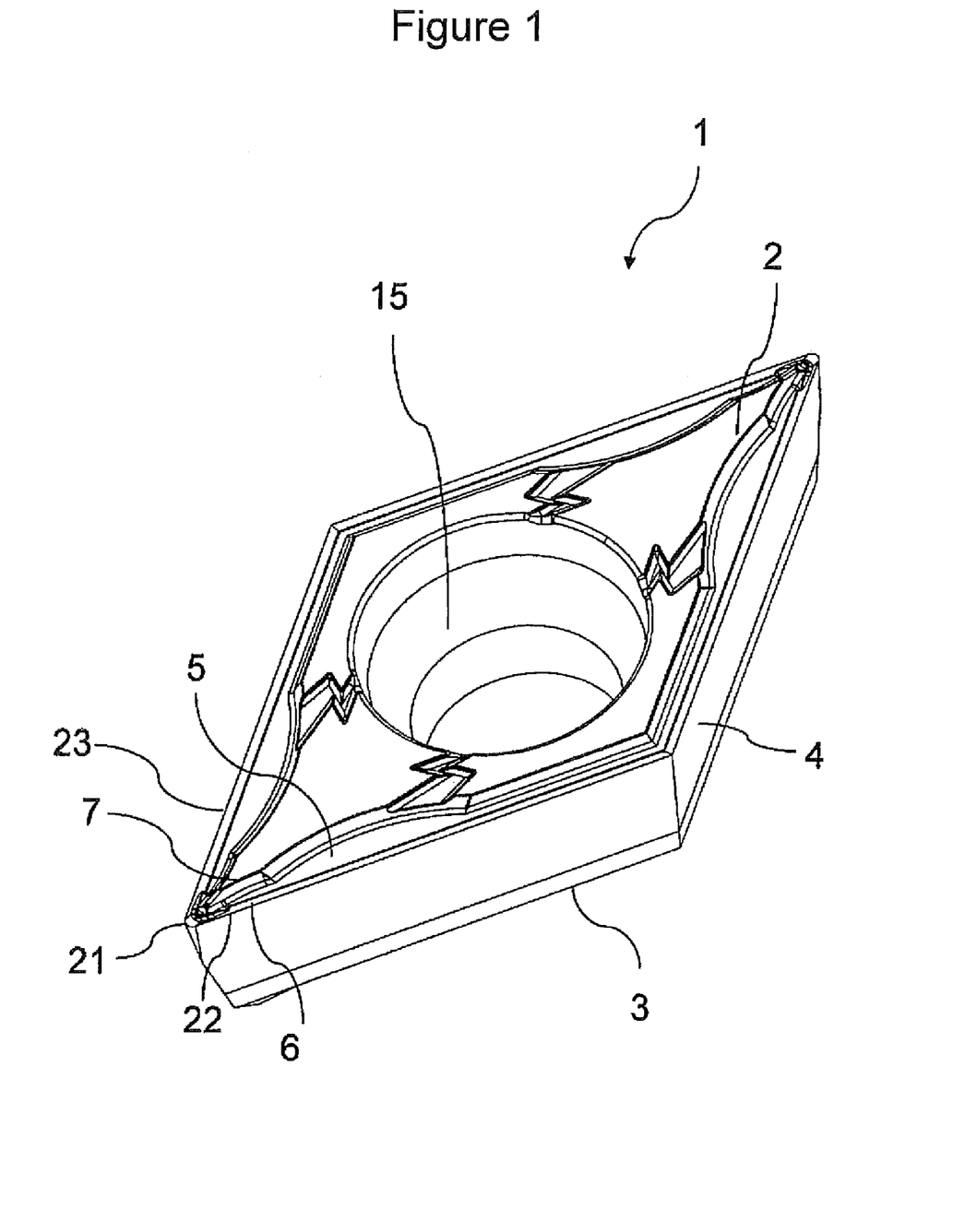
FIG. 1 is a perspective view illustrating a whole cutting insert 1 according to a first embodiment of the present invention.
Figure 2A:
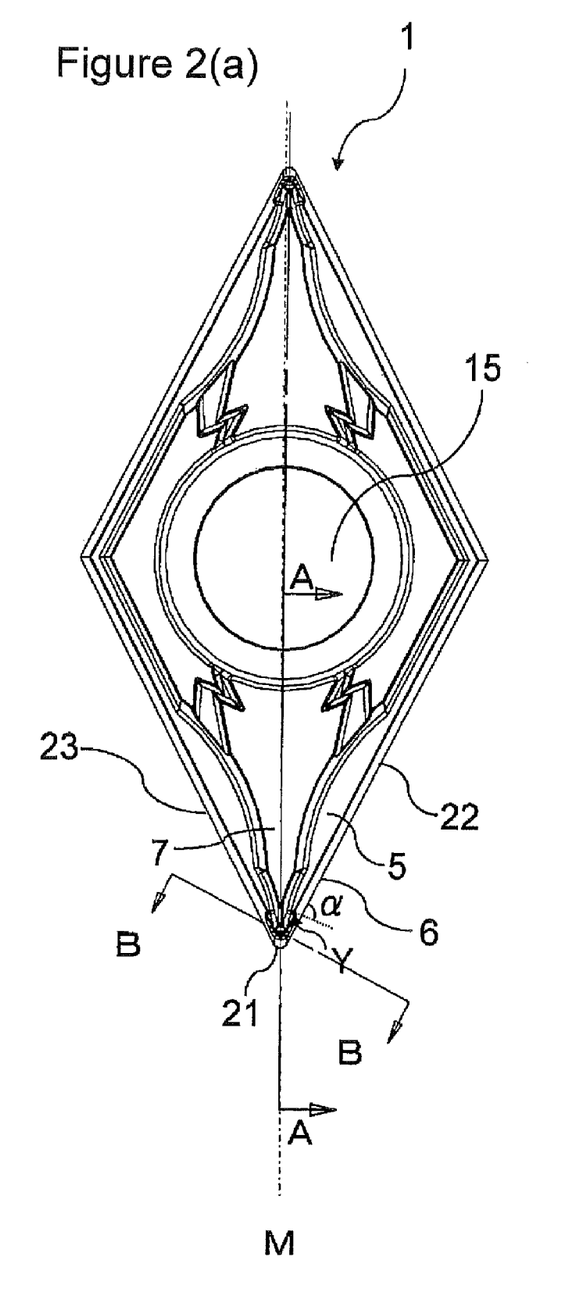
FIG. 2(a) is an upper plan view of the insert 1 and FIG. 2(b) is a side view of the insert 1.
Figure 2B:
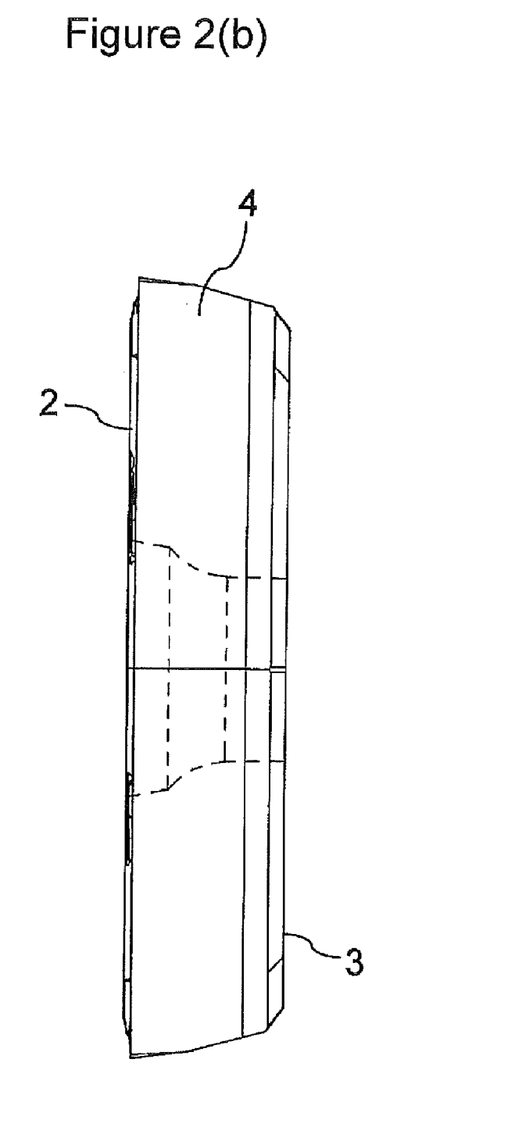
Figure 3:
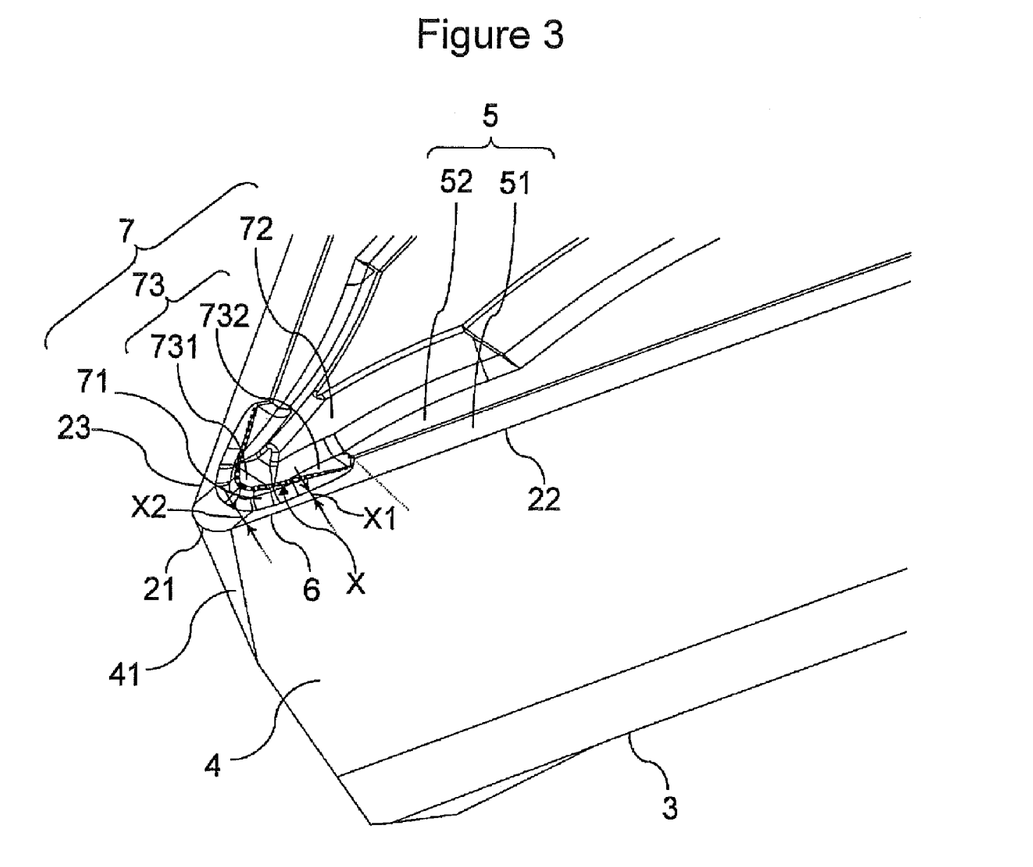
FIG. 3 is an enlarged view of the essential parts of FIG. 1.
Figure 4:
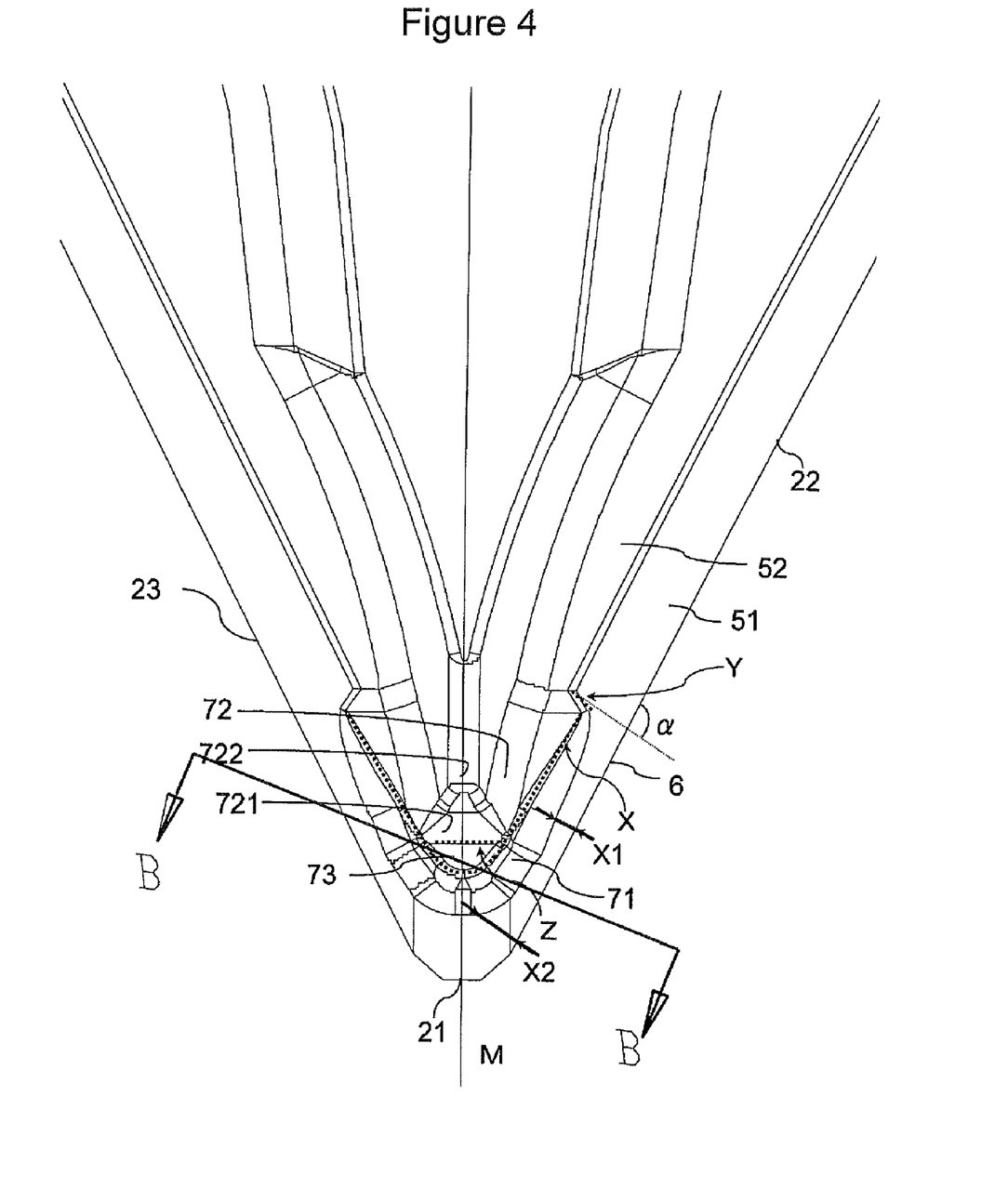
FIG. 4 is an enlarged view of the essential parts of FIG. 2(a).
Figure 5A:
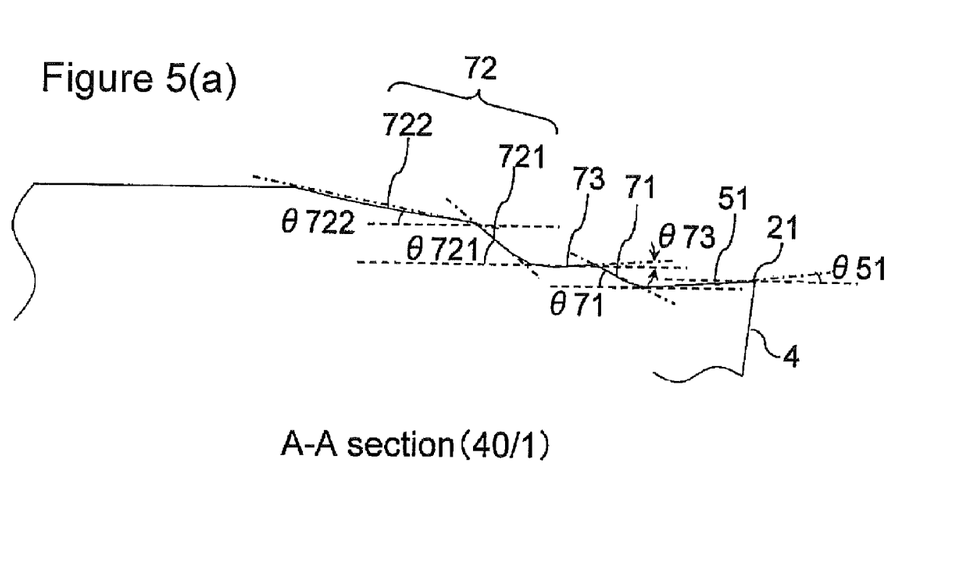
FIG. 5(a) is a cross-sectional view from the A-A line shown in FIG. 2(a) and FIG. 5(b) is a cross-sectional view from the B-B line shown in FIG. 2(a).
Figure 5B:
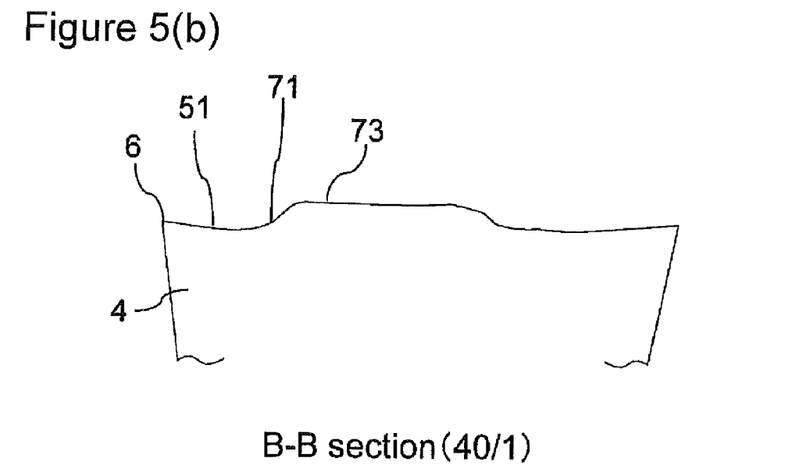

FIG. 1 is a perspective view illustrating a whole cutting insert 1 according to the present embodiment. FIG. 2(a) is upper plan view of the insert 1 and FIG. 2(b) is a side view of the insert 1. In addition, FIG. 3 is an enlarged view of the essential parts of FIG. 1. FIG. 4 is an enlarged view of the essential parts of FIG. 2(a). FIG. 5(a) is a cross-sectional view from the A-A line shown in FIG. 2(a) and FIG. 5(b) is a cross-sectional view from the B-B line shown in FIG. 2(a).

The insert 1 comprises an upper surface 2, a lower surface 3 that corresponds to the upper surface 2, and a side surface 4 that is disposed between the upper surface 2 and the lower surface 3. The upper surface 2 comprises a corner section 21 and a first side 22 that is disposed on one end side of the corner section 21. The upper surface 2 has a roughly diamond shape in the present embodiment.

The insert 1 further comprises a cutting edge 6, a rake face 5, and a protruding section 7.

The cutting edge 6 is formed along at least the corner section 21 and the first side 22. According to the present embodiment, along the two corner sections 21 having an acute angle among four corner sections of the upper surface 2, each cutting edge 6 is formed as shown in FIGS. 1 and 2(a). That is, the insert 1 comprises two cutting edges 6 and is a so-called insert with a specification that utilizes two corners for cutting. Furthermore, the cutting edge 6 is formed to be roughly parallel to the lower surface 3 as shown FIG. 2(b).

In the present embodiment, because the cutting edge 6 is roughly parallel to the lower surface 3, the strength of the cutting edge 6 can be maintained to be high. Therefore, chipping of the cutting edge 6 can be constrained. The cutting edge 6 is not limited to the present embodiment, but, for example, may be inclined so as to approach the lower surface 3 as moving away from the corner section 21. Note that the meaning of being inclined so as to approach the lower surface 3 is the same as being inclined downward. The same applies below unless otherwise noted.

In addition, the rake face 5 is provided in a region, which is located on the inner side of the cutting edge 6, on the upper surface 2. Furthermore, the rake face 5 is provided along at least the corner section 21 and the first side 22. The protruding section 7 is provided in a region, which is located on the inner side with respect to the rake face 5, on the upper surface 2.

The protruding section 7 comprises a first surface 71, a second surface 72 and a third surface 73 as shown in FIGS. 1 to 5.

The first surface 71 is located in the vicinity of the corner section 21 and is inclined so as to move away from the lower surface 3 as approaching inward from the cutting edge 6 as shown in FIGS. 3, 4 and 5(a). Note that the meaning of being inclined so as to move away from the lower surface 3 is the same as being inclined upward. The same applies below unless otherwise noted. Next, the second surface 72 is located on a higher location with respect to the first surface 71 and on the inner side with respect to the first surface 71 based on a corner cutting edge 61. The second surface 72 is inclined upward as approaching inward from the cutting edge 6. That is, it is inclined so as to move away from the lower surface 3 as approaching inward from the cutting edge 6. Note that being located on a higher location means that it is located on a high location in a roughly perpendicular direction to the lower surface 3 based on the lower surface 3. Also, the inner side means a direction approaching the center of the upper surface 2 based on the cutting edge 6. Then, the third surface 73 is provided between the first surface 71 and the second surface 72 as shown in FIGS. 3, 4 and 5(a).

In the present embodiment, an intersection portion X of the first surface 71 and the third surface 73 is inclined so as to approach the lower surface 3 as moving away from the corner cutting edge 61 along the cutting edge 6. In other words, the highest section of the first surface 71 is inclined so as to approach the lower surface 3 as moving away from the corner section 21 in the present embodiment.

According to this type of configuration, chips that are generated at a time of low-cut machining are curled in a stable manner by the first surface 71 that is located in the vicinity of the corner section 21. In contrast, chips that are generated at a time of high-cut machining are curled in a stable manner by the second surface 72 because the curling effect received from the first surface 71 that is located in the vicinity of the first cutting edge 62 is small. In other words, the contribution of the first surface 71 decreases, and the contribution of the second surface 72 increases on the effect of curling chips generated as it moves away from the corner section 21. In this manner, chips can be smoothly discharged at the time of low-cut machining and at the time of high-cut machining because chips can be minutely divided by curling chips in a stable manner. Therefore, the insert 1 according to the present embodiment can perform good chip-discharging properties under a wide range of cutting conditions.

In the present embodiment, in addition to being provided along the corner section 21 and the first side 22, the third surface 73 may comprise a region 731 corresponding to the corner section 21 and a region 732 corresponding to the first side 22, and may have a configuration in which the region 731 and the region 732 are divided. In this case, the intersection portion X is inclined to approach the lower surface 3 as moving away from the corner section 21 for the region 731 and for the region 732. As a result, good cutting discharging property can be demonstrated in the relatively long region from the corner section 21 to the first side 22, under a wider range of cutting condition.

In addition to the above description, the insert 1 can comprise the following configuration.

Fist, chip-discharging properties based on the configuration for the region corresponding to the corner section 21 are described in detail.

FIG. 5(a) is a cross-sectional view from the A-A line shown in FIG. 2(a), and more specifically, FIG. 5(a) is a diagram illustrating a cross section, which passes through an equal angle bisector M of the first side 22 and the second side 23, roughly perpendicular to the lower surface 3.

As shown in this Figure, in the present embodiment, the third surface 73 is inclined in the region corresponding to the corner section so as to approach the lower surface 3 as approaching inward from the corner cutting edge 61.

Such a configuration allow the first surface 71 to curl chips generated by the cutting with using the corner cutting edge 61 under low cut machining in a stable manner. In addition, chips that climbed over the first surface 71 among chips that were generated from the cutting by the corner cutting edge 61 are curled in a stable manner by the second surface 72 under cutting conditions having low cutting depth and high feed (high feed). Under a wide range of cutting conditions, chips that were generated by the cutting with the corner cutting edge 61 can be curled in a stable manner by the first surface 71 and the second surface 72, and chips are divided minutely and discharged smoothly. In this manner, the insert 1 can, even at the region corresponding to the corner section, demonstrate good chip-discharging properties under a wide range of cutting conditions.

The third surface 73 is a flat surface in the present embodiment. More specifically, the third surface 73 is an inclined plane that is inclined along the equal angle bisector M of the first side 22 and the second side 23, as shown in FIG. 5 (a). That is, as shown in FIG. 5 (a), the third surface 73 is inclined at an inclination angle of θ73 so as to approach the lower surface 3 as approaching inward from the corner section 21. The third surface 73 is not limited to the inclined plane that approaches the lower surface 3 as described above, and may be a flat surface that is roughly parallel to the lower surface 3.

Such a configuration produces an effect of pulling in chips, which have climbed above the first surface 71, inside the third surface 73 under cutting conditions having low cutting depth and high feed. Therefore, it can constrain chips from clogging between the cutting edge 6 and the protruding section 7.

As a modified example of such a third surface 73, for example, the third surface 73 may be a concave surface that is inclined so as to approach the lower surface 3 as approaching from the intersection portion X to the inner side.

In addition, in the present embodiment, the second surface 72 comprises a first inclined plane 721 and a second inclined plane 722 in a region corresponding to the corner section 21, as shown in FIGS. 1 and 5 (a). The first inclined plane 721 is located on the corner section 21 side, and is inclined so as to move away from the lower surface 3 as approaching inward from the cutting edge 6. The second inclined plane 722 is located on the inner side with respect to the first inclined plane 721, and is inclined so as to move away from the lower surface 3 as approaching inward from the cutting edge 6. The inclination angle θ721 for the lower surface 3 of the first inclined plane 721 is greater than the inclination angle θ722 for the lower surface 3 of the second inclined plane 722, as shown in FIG. 5(a). Here, the inclination angles θ721 and θ722 both refer to each inclination angle for the cross section that passes through the equal angle bisector M of the first side 22 and the second side 23 and that is roughly perpendicular to the lower surface 3.

With such a configuration, when chips generated under cutting conditions having low cutting depth and high feed climb above the first surface 71, the chips are curled in the stable manner by the first inclined plane 721 of the second surface 72. In contrast, at the time of high-cut machining, a collision impact to a region corresponding to the corner section 21 of the second surface 72 (the first inclined plane 721 and the second inclined plane 722) can be minimized. As described above, the breaker function at the time of low-cut machining can be maintained high, and the cutting resistance at the time of high-cut machining can be reduced.

In the present embodiment, the first inclined plane 721 and the second inclined plane 722 comprise the relationships of the respective inclination angle as described above, the length L721 of the first inclined plane 721 in the direction along the equal angle bisector M of the first side 22 and the second side 23 is set to be smaller than the length L722 of the second inclined plane 722 as viewed from the upper surface, as shown in FIG. 2 (a) and FIG. 4.

With such a configuration, the above-described effect is enhanced further. Particularly, the breaker function can be maintained at a high level at the time of low-cut machining.

Although the relationships θ721>θ722 and L721<L722 are satisfied in the present embodiment, the first inclined plane 721 and the second inclined plane 722 may be set to satisfy only the relationship θ721>θ722.

In the present embodiment, the intersection portion Z of the third surface 73 and the second surface 72 is roughly perpendicular to the equal angle bisector M of the first side 22 and the second side 23 as viewed from the upper surface, as shown in FIG. 4. In this case, chips, which are generated under the cutting conditions having low cutting depth and high feed, are generated along the equal angle bisector M, and can come in contact with the front of the second surface 72 (the first inclined plane 721) in a stable manner. Therefore, chips are curled in a stable manner by the second surface 72, and thereby being divided minutely.

Then, in the present embodiment, the first surface 71 is provided so as to approach the cutting edge 6 as moving away from the corner section 21 as viewed from the upper surface, as shown in FIG. 3 and FIG. 4. More specifically, the first surface 71 may comprise a region that is provided so as to approach the cutting edge 6 with distance from the corner section 21. The region is a region that is provided along the first side 22 on the first surface 71. In this region, the distance X1 between the cutting edge 6 that is located on the side far from the corner section 21 and the first surface 71 is smaller than the distance X2 between the cutting edge 6 that is located on the side near the corner section 21 and the first surface 71, as shown in FIG. 4. Here, the distances X1 and X2 each refer to a distance in the direction that is roughly perpendicular to the cutting edge 6.

With such a configuration, since the distance to the first surface 71 which chips come in contact with is shortened with distance from the corner section 21, the diameter of the curl can be small. In contrast, chips can be curled in a stable manner by the first surface 71 and the second surface even at the time of medium-cut machining. As a result, generated chips are divided minutely and discharged smoothly.

Then, in the present embodiment, the height of the highest section of the first surface 71 is preferably ⅓ or less the height of the highest section of the second surface 72, as shown in FIG. 5(a). This configuration can result in appropriately providing both a breaker effect obtained by the first surface 71 at the time of low-cut machining and an effect of minutely dividing chips obtained by the second surface at a time of high-feed machining. Here, the highest sections of the first surface 71 and the second surface 72 refer respectively to the sections that are located on the highest location in the height direction mentioned above. In the present embodiment, the highest sections of the first surface 71 and the second surface 72 both are the sections that are located above the equal angle bisector M of the first side 22 and the second side 23. The height refers to the measurement in a direction roughly perpendicular to the lower surface 3 on the basis of the intersection of a first rake face 51 and the first surface 71.

The second surface 72 is provided so as to extend to a position that is away from the corner section 21 with respect to the first surface 71 and the third surface 73. With this configuration, chips, which are generated from the cutting at the time of high-cut machining by the first cutting edge 62 that is located relatively far away from the corner section 21, can be curled in a stable manner by the second surface 72 and be discharged smoothly. Accordingly, good chip-discharging properties can be demonstrated under a wide range of cutting conditions. Here, the position that is far away from the corner section 21 is determined by the distance from the corner section 21 in the direction along the cutting edge 6.

In the present embodiment, the rake face 5 comprises the first rake face 51 that is provided on the cutting edge 6 side and the second rake face 52 that is located on the inner side with respect to the first rake face 51, as shown in FIGS. 1 to 4.

The first rake face 51 is provided along the corner section 21 and the first side 22. In addition, the second rake face 52 is provided along the first side 22. The second rake face 52 is provided between the first rake face 51 and the second surface 72.

That is, the first surface 71 of the protruding section 7 is arranged from the cutting edge 6 via only the first rake face 51 as shown in FIGS. 1 to 4. That is, the first surface 71 is provided in the close vicinity of the cutting edge 6 so as to be in contact with the first rake face 51. In contrast, the second surface 72 is arranged in the region away from the corner section 21 from the cutting edge 6 via not only the first rake face 71 but also the second rake face 52.

With such a configuration, chips generated at the time of high-cut machining are first curled in a stable manner by the second rake face 52 and then subsequently curled in a further stable manner by the second surface 72. Since chips, which are curled in 2 steps in this manner, are divided minutely in a stable manner, the chips are discharged smoothly.

Furthermore, the angle α between the intersection portion Y of the third surface 73 and the second rake face 52 and the first side 22 is preferably 90 degrees or below as viewed from the upper surface as shown in FIG. 2(a) and FIG. 4.

In the present embodiment, the angle α is roughly 90 degrees. In this configuration, the first surface 71 performs the function to curl chips at the time of low-cut machining, and the second surface 72 performs the function to curl chips at the time of high-cut machining. That is, since the insert 1 comprises the protruding section 7 that functions under the cutting conditions to which the first surface 71 and the second surface 72 correspond, the effect of curling both chips that are generated at the time of low-cut machining and chips that are generated at the time of high-cut machining in a stable manner, is increased.

In the present embodiment, an inclination angle θ51 of the first rake face 51 with respect to the lower surface 3 stays constant along the cutting edge 6 as shown in FIG. 5(a). In FIG. 5(a), lines that are roughly parallel to the lower surface 3 are shown in dotted lines, and θ51 is an angle formed between the dotted lines and the first rake face 51. In the present embodiment, the second rake face 52 is roughly parallel to the lower surface 3.

Furthermore in the present embodiment, the side edge section of the corner section 21 of the first surface 71 has a roughly arc-shape as viewed from the upper surface. The radius of curvature R73 of the side edge section of the corner section 21 of the first surface 71 is greater than the radius of curvature R21 of the corner section 21 as viewed from the upper surface. With such a configuration, a wide region corresponding to the corner section 21 can be assured on the first surface 71. Accordingly, while maintaining high chip-discharging properties at the time of medium-cut machining, chips that are generated at the time of low-cut machining can be brought into contact with the first surface 71 smoothly and be curled in a stable manner. That is, chips that are generated by the corner cutting edge 61 located in the corner section 21 and that are discharged along the equal angle bisector M can be curled by the first surface 71 in a stable manner.

The insert 1 according to the present embodiment has a positive clearance angle, and is the so-called positive type of insert. More specifically, the regions other than a flat surface 41 of the side surface 4 is inclined so as to be located inward as approaching the lower surface 3 from the upper surface 2. In the present embodiment, the side surface 4 comprises the flat surface 41 in the region that corresponds to the corner section 21 as shown FIG. 1, FIG. 3 and FIG. 4. The flat surface 41 is provided in the close vicinity of the corner section 21. The flat surface 41 is inclined so as to be located outward as approaching the lower surface 3 from the upper surface 2.

A region along the first side 22 on the second surface 72 is arranged so as to move away from the first side 22 as moving away from the corner section 21. With regard to that, the measurement in the direction that is roughly perpendicular to the first side 22 of the third surface 73 increases as moving away from the corner section 21 as viewed from the upper surface as shown in FIG. 2(a), FIG. 3 and FIG. 4.

In the present embodiment, as described above, the cutting edge 6 is roughly parallel to the lower surface 3, and is inclined so as to approach the lower surface 3 as the intersection portion X moves away from the corner cutting edge 61. With regard to that, the measurement in the direction that is roughly perpendicular to the first side 22 of the first surface 71 decreases as moving away from the corner section 21 as viewed from the upper surface as shown in FIG. 2(a), FIG. 3 and FIG. 4.

(Second Embodiment) Next, with reference to FIGS. 6 to 9, an insert 1' according to a second embodiment of the present invention is described in detail. In the present embodiment, for the configuration that is the same as the first embodiment, the same symbols are used and an explanation is omitted.

Figure 6:
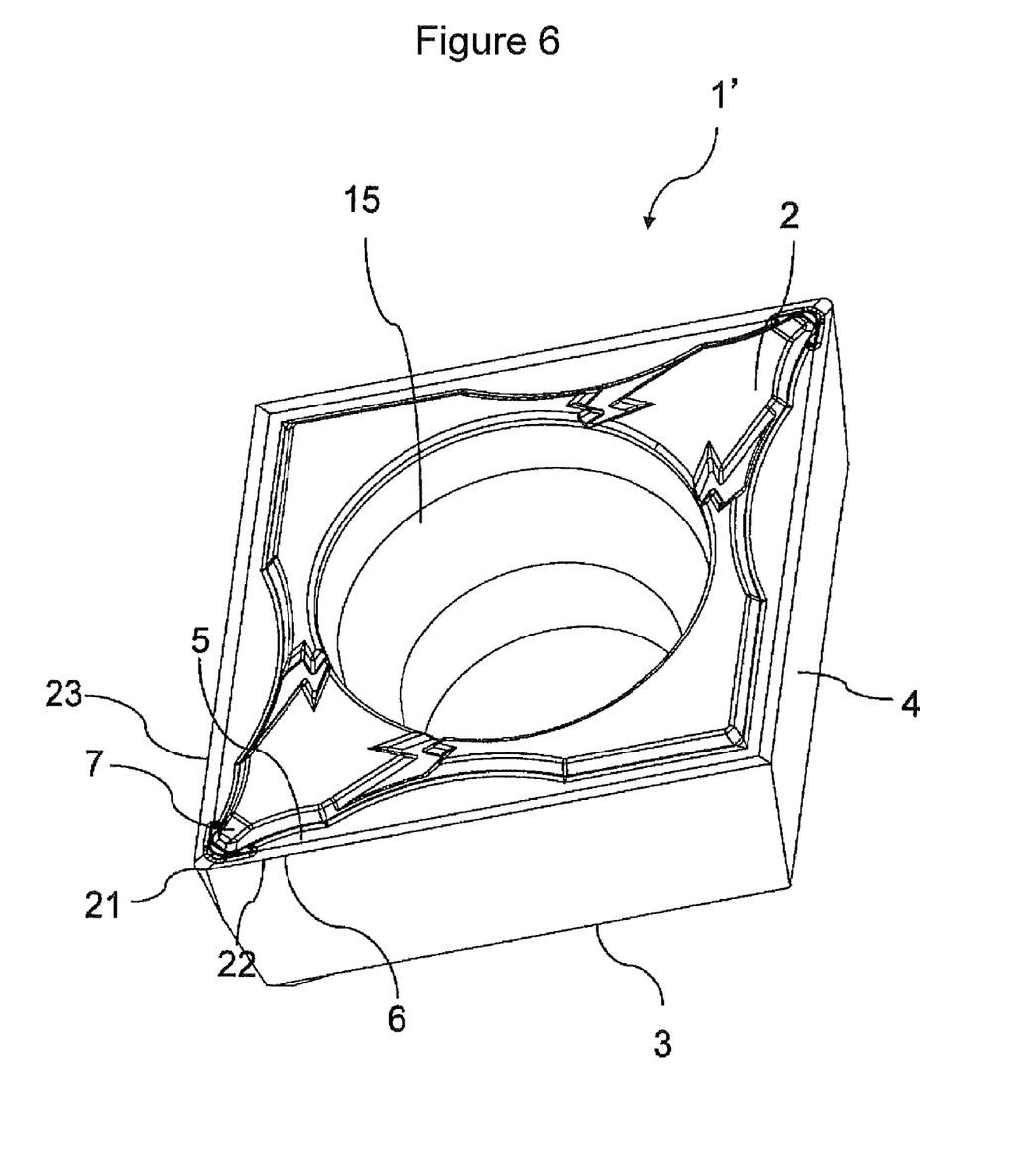
FIG. 6 is a perspective view illustrating a whole cutting insert 1' according to a second embodiment of the present invention.
Figure 7A:
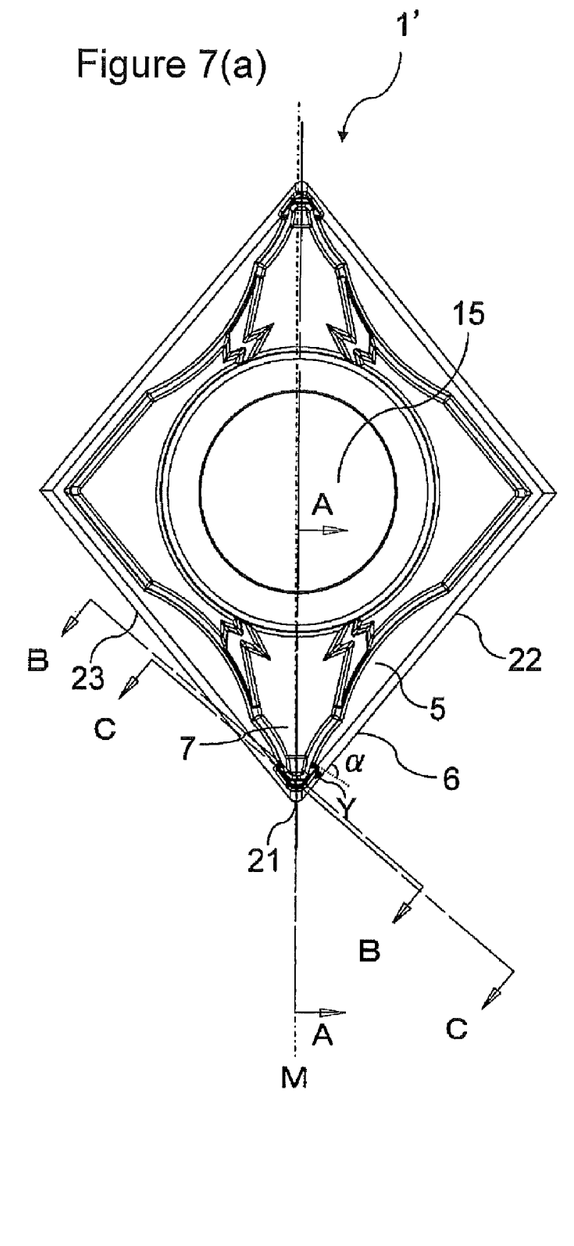
FIG. 7(a) is an upper plan view of the insert 1' and FIG. 7(b) is a side view of the insert 1'.
Figure 7B:
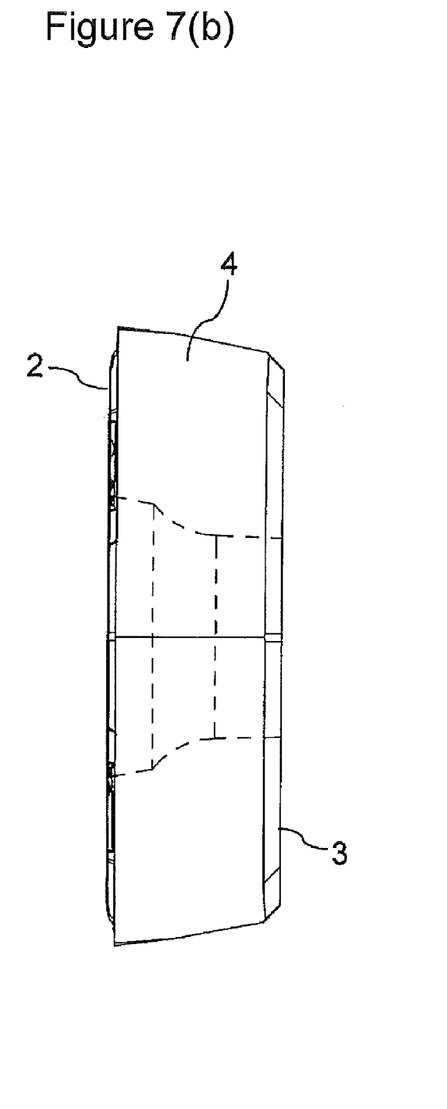
Figure 8:
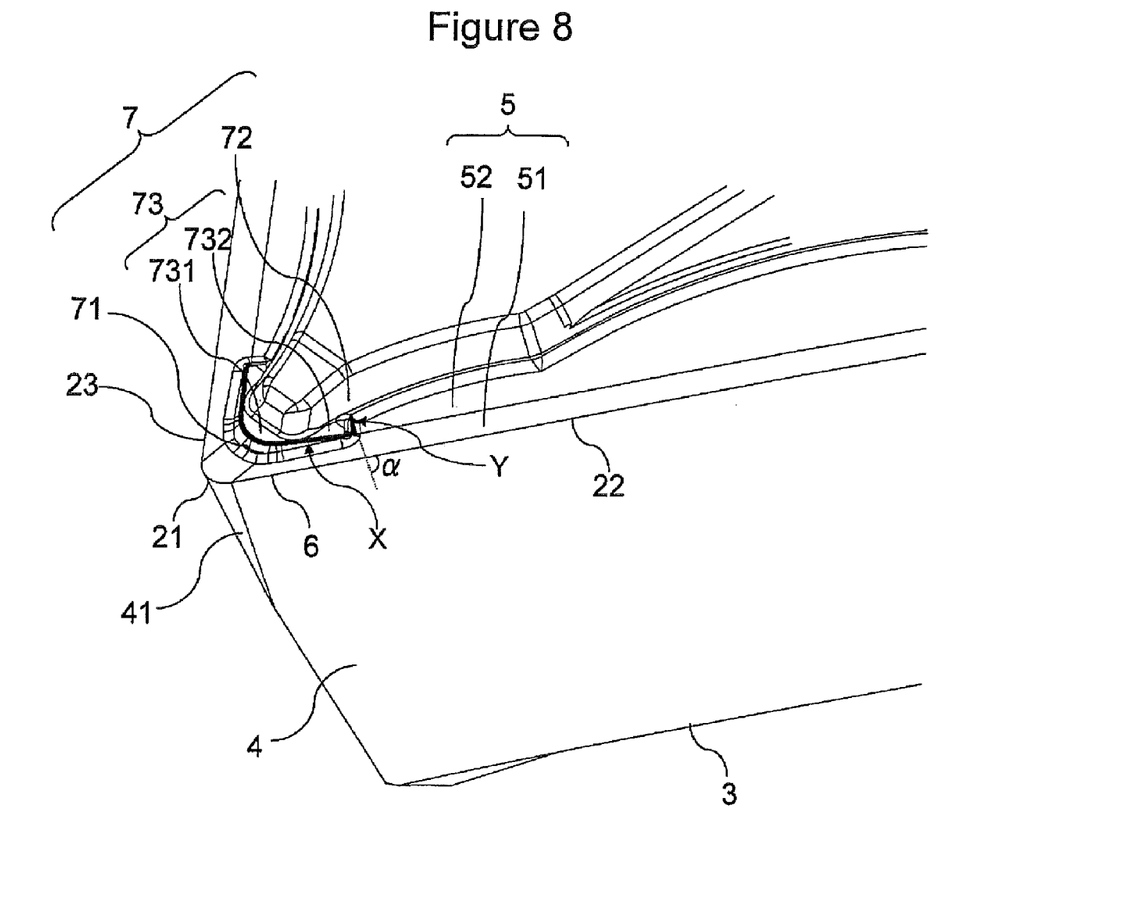
FIG. 8 is an enlarged view of the essential parts of FIG. 6.
Figure 9A:
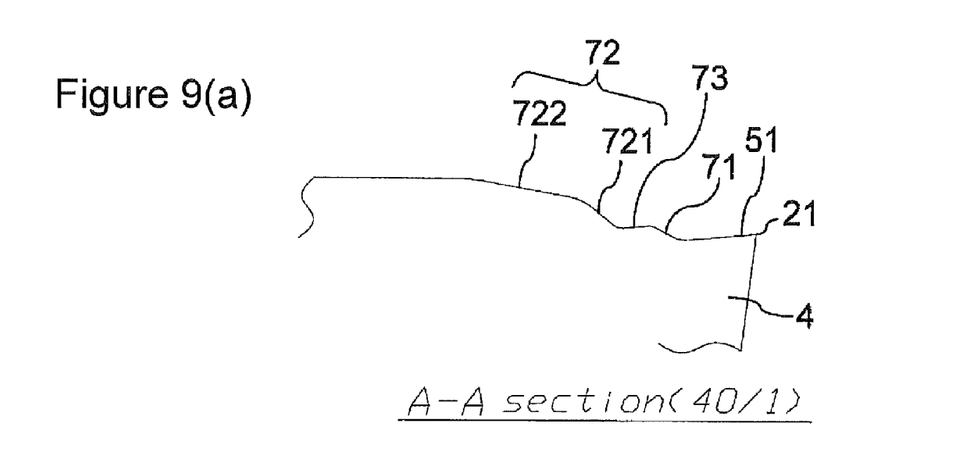
FIG. 9(a) is a cross-sectional view taking from the A-A line shown in FIG. 7(a)
Figure 9B:
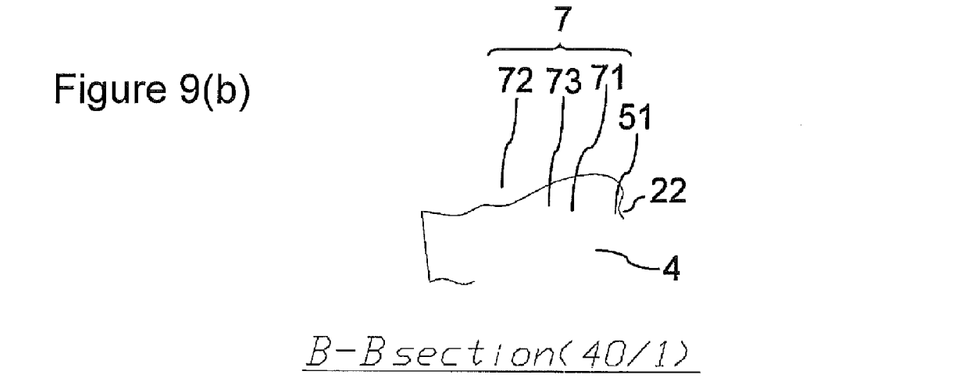
FIG. 9(b) is a cross-sectional view taking from the B-B line shown in FIG. 7(a) and FIG. 9(c) is a cross sectional view taking from C-C line shown in FIG. 7(a).
Figure 9C:
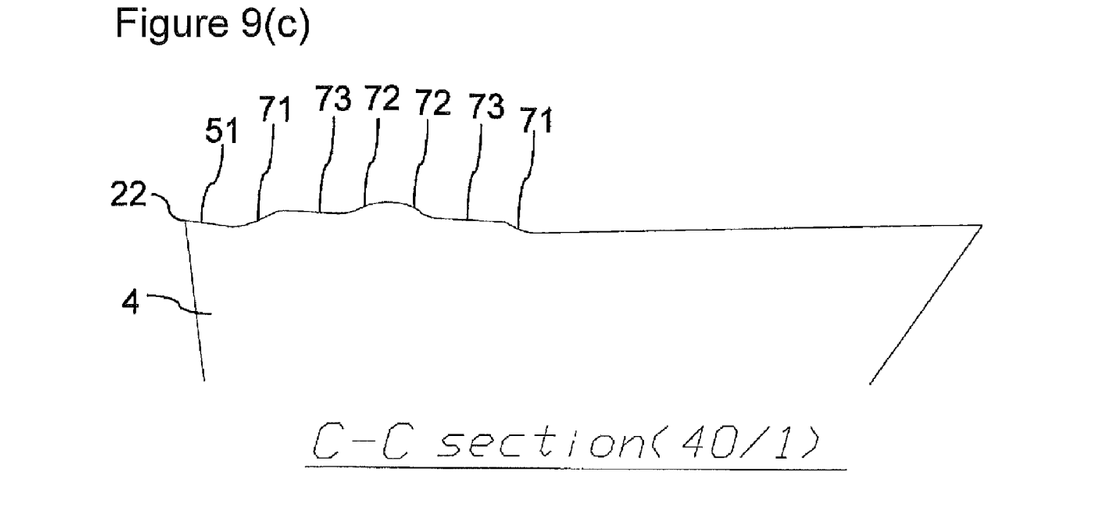

FIG. 6 is a perspective view illustrating a whole cutting insert 1', FIG. 7(a) is a plan view of the insert 1' and FIG. 7(b) is a side view of the insert 1'. FIG. 8 is an enlarged view of the essential parts of FIG. 6, FIG. 9(a) is a cross sectional view taking from the A-A line shown in FIG. 7(a), FIG. 9(b) is a cross sectional view taking from the B-B line shown in FIG. 7(a) and FIG. 9(c) is a cross sectional view taking from C-C line shown in FIG. 7(a).

In the insert 1' according to the present embodiment, the third surface 73 is provided along the corner section 21 and the first side 22, and a region corresponding to the corner section 21 and a region corresponding to the first side 22 are provided continuously. That is, the third surface 73 is provided not only along the region that corresponds to the corner section 21 on the upper surface 2, but also along the region that corresponds to the first side 22. Therefore, the intersection portion X, as described above, is inclined downward as moving away from the corner cutting edge, and its inclination extends to the region which corresponds to the first side 22 on the upper surface 2. In addition, the third surface 73 is constituted from one continuous surface. That is, the third surface 73 extends in the longitudinal direction of the cutting edge 6, and has no disconnected region in the direction along the cutting edge 6.

With this configuration, therefore, an intersection ridge section of the first inclined plane 721 and the region along the first side 22 on the second surface 72 is arranged so as to move away from the cutting edge 6. As a result, chips can be constrained from being clogged in the intersection ridge section. As a result, the chip-discharging properties can be further improved under a wide range of cutting conditions.

Also with this configuration, generated chips can be curled in a stable manner and discharged smoothly not only during low cut machining, but also during medium cut machining. In addition, the cutting resistance can be reduced during high cut machining.

In the present embodiment, as is the same as the first embodiment, the region which corresponds to the corner section 21 on the third surface 73 comprises a first inclined plane 731 that is located on the corner section 21 side and a second inclined plane 732 that is located on the inner side of the first inclined plane 731. However, unlike the first embodiment, in the present embodiment, the first inclined plane 731 is provided so as to extend along the direction that is roughly perpendicular to the equal angle bisector M of the first side 22 and the second side 23. That is, the upper end of the first inclined plane 731 is bigger in measurement in the direction that is roughly perpendicular to the equal angle bisector M of the first side 22 and the second side 23 than the upper end of the first inclined plane 731 according to the first embodiment.

With this configuration, chips that are generated along the equal angle bisector M of the first side 22 and the second side 23 can be curled in a stable manner by the third surface 73 under the cutting conditions having low cutting depth and high feed.

In the present embodiment, as is same as the first embodiment, the third surface 73 is provided such that the third surface 73 is inclined so as to approach the lower surface 3 as moving away from the corner section 21 along the equal angle bisector M of the first side 22 and the second side 23.

For the configuration of the above-mentioned insert, the following modifications may be added.

For example, in the above-mentioned embodiments, although the third surface 73 illustrated an example of a configuration that is provided along the corner section 21 and the first side 22, it is not limited thereto, and the third surface 73 may be disposed in the position that corresponds to at least the corner section 21. That is, the third surface 73 may have a configuration that does not extend to the region along the first side 22.

In the above-mentioned embodiments, the insert with a positive clearance angle, a so-called positive type of insert has been illustrated; however, it is not limited thereto, and it maybe an insert with a zero clearance angle, the so-called, a negative type of insert. For the case of the negative type, it is installed in a state having a predefined inclination angle with respect to a reference surface 14 of a holder 12. In a state in which it is installed to the holder 12, the intersection portion X of the insert may be inclined so as to approach the reference surface 14 of the holder 12 as it moves away from the corner section 21.

In the above-mentioned embodiments, although a configuration in which the upper surface 3 having a roughly diamond-like shape has been illustrated as an example, it is not limited thereto. As long as a configuration comprises the corner section 21 and the first side 22, the upper surface 3 may have a configuration having another roughly polygonal shape such as a roughly triangular shape.

In the above-mentioned embodiments, although the side edge section of the corner section 21 of the first surface 71 illustrates a configuration having an arc shape as viewed from the upper surface, it is not limited thereto. For example, the edge section of the corner section 21 of the first surface 71 may have a configuration having a linear shape.

The measurements in a direction roughly perpendicular to the cutting edge 6 of the first surface 71, the second surface 72, and the third surface 73 are not limited to the values shown in the present embodiment, and can be selected appropriately.

Figure 10:
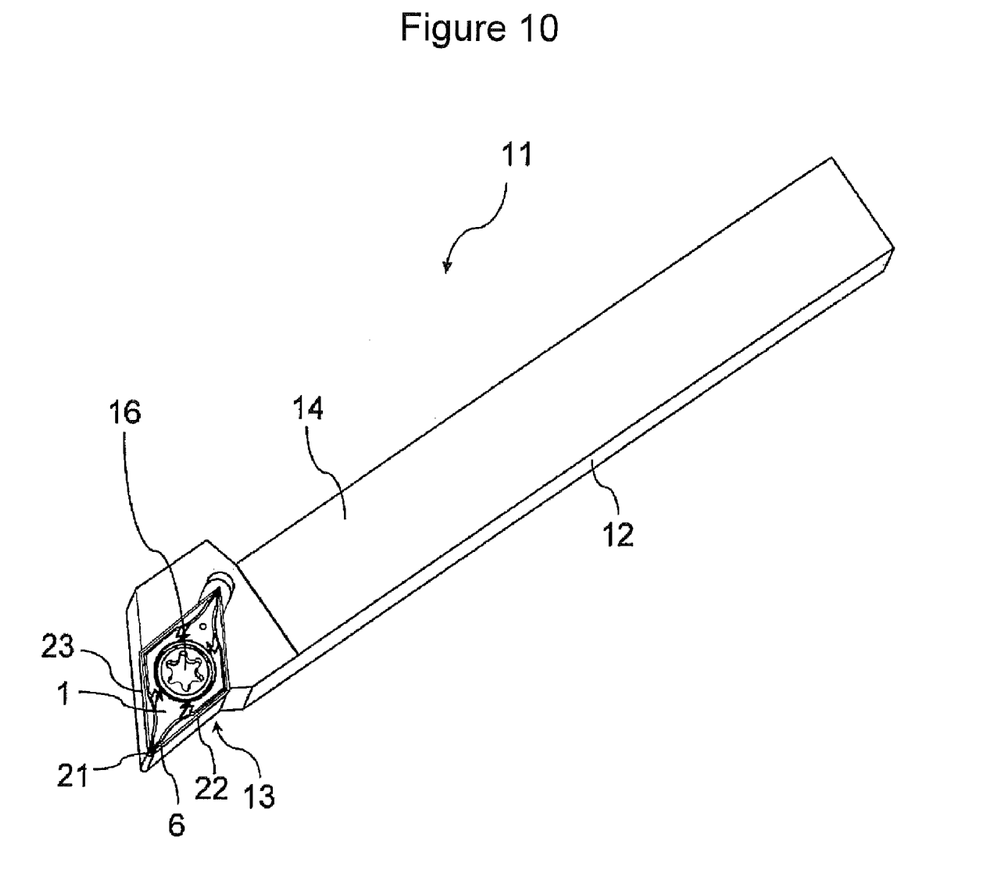
FIG. 10 is a perspective view illustrating a whole cutting insert 11 according to an embodiment of the present invention.
Figure 11A:
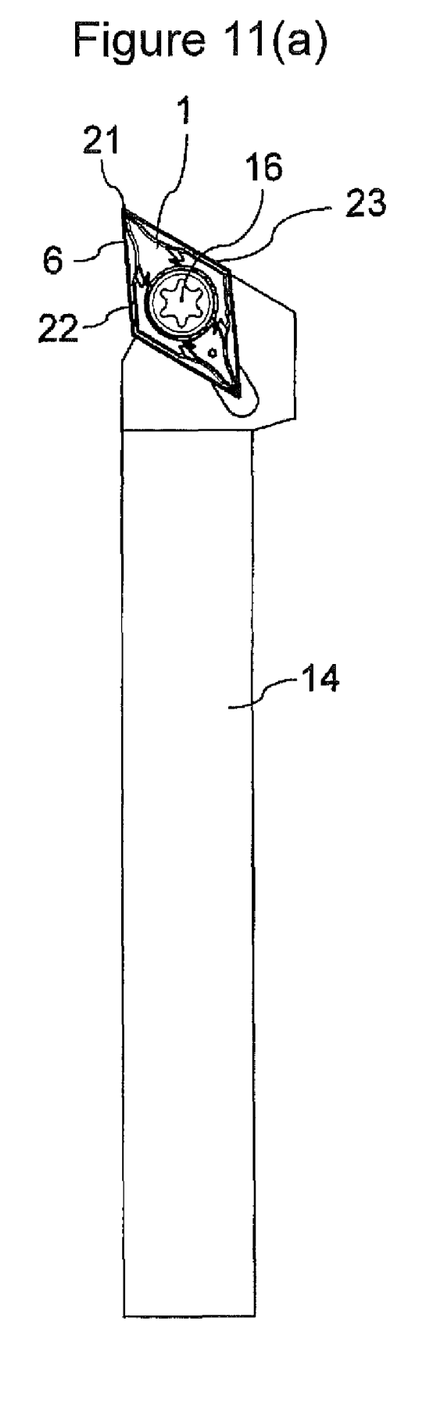
FIG. 11(a) is an upper plan view of the insert 11 and FIG. 11(b) is a side view of the insert 11.

(Cutting tool) Next, a cutting tool 11 according to an embodiment of the present invention is described with reference to FIG. 10 and FIG. 11. FIG. 10 is an overall perspective view of the cutting tool 11, and FIG. 11 provides a plane view of the cutting tool 11 in (a), and a side surface view in (b).

The cutting tool 11 comprises a holder 12 and the above insert 1. The holder 12 comprises an insert pocket 13 on the edge. The insert pocket 13 has an opening toward the upper surface, one side surface and a side surface area of the holder 12. The insert 1 is attached to the insert pocket 13 such that the cutting edge 6 protrudes from the outer peripheral section of the holder 12. More specifically, the corner section 21 of the insert 1 is disposed on the edge side of the holder 12 and on one surface side. The first side 22 of the insert 1 is disposed along one side surface of the holder 12.

The insert 1 is tightened with a fixed screw 16 to the holder 12. More specifically, the insert 1 comprises a through hole 15 that penetrates from the center of the upper surface 2 to the center of the lower surface 3. On the other hand, the insert pocket 13 of the holder 12 has a screw hole. The insert 1 is, attached to the insert pocket 13 of the holder 12 by the fixed screw 16 that is inserted into the through hole and is screwed into the screw hole.

Figure 11B:
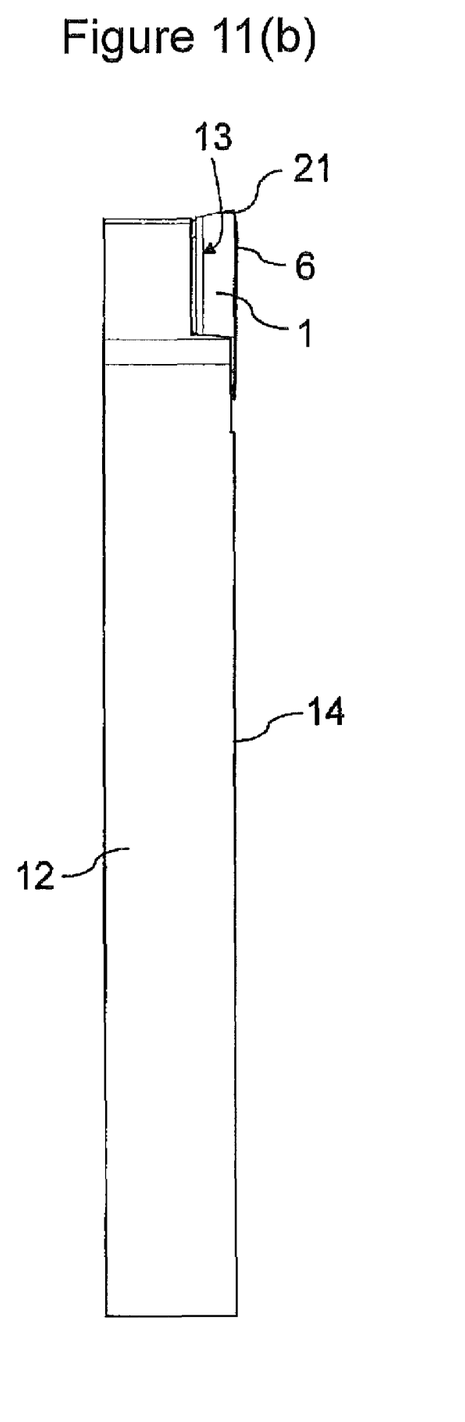

In the present embodiment, as described above, the insert 1 is a positive type, and the lower surface 3 is disposed so as to be parallel to the reference surface 14 of the holder 12 as shown in FIG. 11(b).

Here, the reference surface 14 of the holder 12 is provided in a holding section that is held by an external device. In the present embodiment, since the holding section of the holder 12 constitutes a prism shape, the reference surface 14 of the holder 12 refers to one side surface of the holding section as shown in FIG. 10 and FIG. 11.

Since the cutting tool 11 comprises the above-mentioned insert 1, the cutting tool 11 demonstrates good chip-discharging properties in a wide range of cutting conditions. Particularly, chips can be divided minutely even when a work that is relatively ductile such as low carbon steel is cut. Therefore, it can be constrained from being coiling around the holder 12 with chips which are not curled and reach a state in which they are stretched. Therefore, the machining accuracy increases, and chipping of the cutting edge can be constrained. As a result, the tool life lengthens.

Figure 12A:
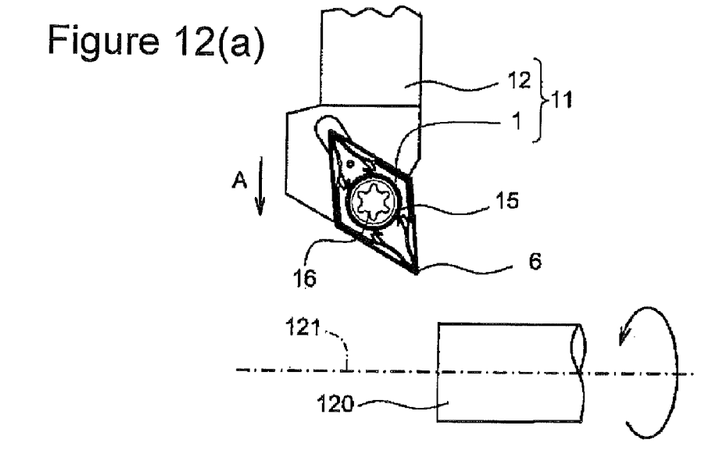
FIGS. 12(a)-(c) are schematic views illustrating a process of a cutting method according to an embodiment of the present invention.

(METHOD OF CUTTING WORKS) (Cutting method of a work) At last, a cutting method of a work according to an embodiment of the present invention is described with reference to FIG. 12.

The cutting method of the work according to the present embodiment comprises the following (I) to (IV) steps.

(I) a step for rotating a work 120, (II) a step for bringing the cutting tool 11 in the close vicinity of the work 120, (III) a step for cutting the work 120 by bringing the cutting edge 6 of the cutting tool 11 in contact with the surface of the work 120, and (IV) a step for moving the cutting tool 11 away from the work 120.

Because this type of cutting method uses the cutting tool 11 having excellent chip-discharging properties as described above, it can constrain chips from coiling around the holder 12. Therefore the machining accuracy can be improved. As a result, cutting can be performed with high finished-surface accuracy on a long-term basis in a stable manner.

More specifically, the work 120 and the cutting tool 11 in which the insert 1 is installed to the holder 12 are prepared at first. The work 120 is rotated centering on a shaft center 121 of the work 120. Furthermore, the cutting edge 6 of the cutting tool 11 is brought in the vicinity of the work 120 (in a direction of the arrow A in FIG. 12 (a)). The cutting edge 6 and the work 120 may be brought relatively close to each other, and for example, the work 120 may be brought close to the cutting tool 11.

Figure 12B:
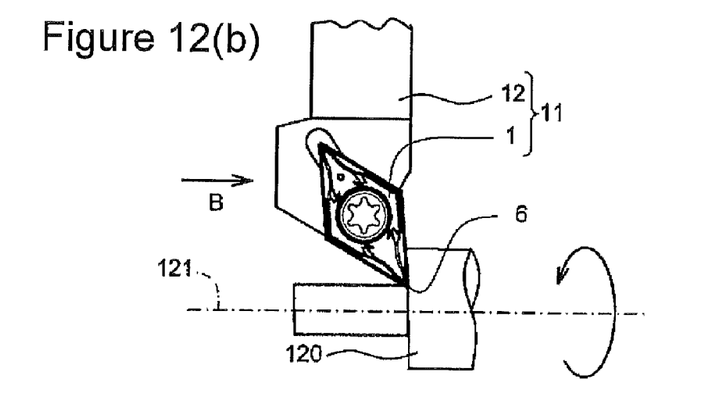

Next, as shown in FIG. 12 (b), the cutting edge 6 is brought in contact with the work 120, and while the cutting tool 11 is moving in the direction of the arrow B, the work 120 is cut. Here, the insert 1 that is attached to the cutting tool 11, as described above, comprises the protruding section 7 which comprises the first surface 71, the second surface 72 and the third surface 73, and is inclined so as to approach the lower surface 3 as the intersection portion X moves away from the corner section 21. Therefore, generated chips can be curled in a stable manner by the first surface 71 and the second surface 72 of the protruding section 7 and can be discharged smoothly. Particularly, both for low cut machining and high cut machining, generated chips can be curled in a stable manner and divided minutely, and chips can be discharged smoothly. Therefore, during cutting, chips can be constrained from coiling around the holder 12. Therefore, it is possible to constrain the machining accuracy from deteriorating in a short time. As a result, on a long-term basis, it is possible to demonstrate the cutting performance with high machining accuracy.

Figure 12C:
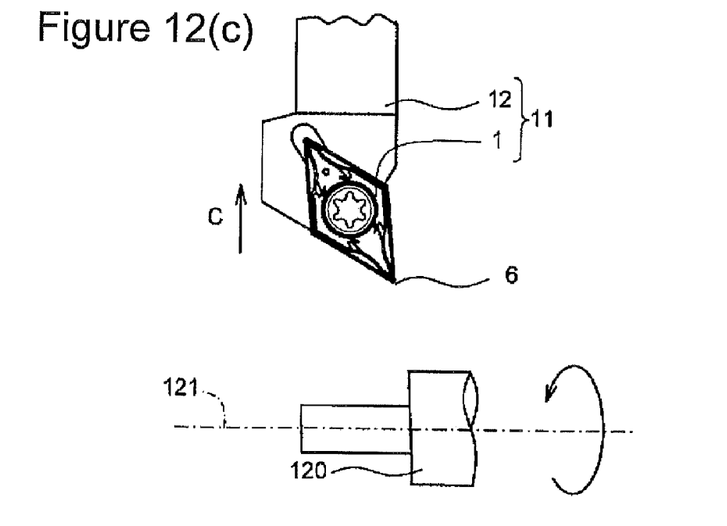

Subsequently, as shown in FIG. 12 (c), the cutting tool 11 is isolated from the work 120 in the direction of the arrow C.

The work 120 and the cutting tool 11 may be moved relatively away from each other, and for example, the work 120 may be moved away from the cutting tool 11.

When continuing cutting, while maintaining the work 120 in a state in which it is rotated, a step for bringing the cutting edge 6 of the cutting tool 11 in contact with different sections of the work 120 may be repeated.

Although the steps have been described by dividing into the above (I) to (IV), in order to attain the above effect, the cutting method may comprise the steps for rotating the work 120 and bringing the cutting edge 6 of the cutting tool 1 in contact with the surface of the rotated work 120.

Although some embodiments of the present invention are illustrated above, the present invention is not limited to the above-mentioned embodiments and obviously may be used in any embodiment that does not depart from the substance of the invention.

What is claimed is:

1. A cutting insert comprising:
   an upper surface;
   a lower surface;
   a first side and a second side meeting at a corner section;
   an inner side defined between the first side, the second side and the corner section and extending in an inward direction from the corner section, the first side and the second side;
   a side surface intersecting with the upper surface and the lower surface;
   a cutting edge comprising a corner cutting edge located at the corner section and where the side surface intersects with the upper surface and comprising a first cutting edge located at the first side;
   a rake face extending along the cutting edge on the upper surface; and
   a protruding portion located deeper on the inner side than the rake face and located on the upper surface, the protruding portion comprising:
      a first surface inclined upward in the inward direction from the cutting edge;
      a second surface that is located on a higher location with respect to the first surface and deeper on the inner side with respect to the first surface and that is inclined upward in the inward direction; and
      a third surface located between the first surface and the second surface, wherein an intersection portion between the first surface and the third surface is inclined downward in the inward direction; wherein the rake face comprises:
      a first rake face extending along the cutting edge; and
      a second rake face located deeper on the inner side in relation to the first rake face and spaced from the corner section with respect to the first surface and the third surface, the second rake face being located between the first rake face and the second surface; wherein
      an intersection line along which the third surface meets the second rake face extends at an angle of 90 degree or less with respect to the first side as viewed in a top plane view from the upper surface in direction of the lower surface.

2. The cutting insert according to claim 1, wherein the third surface is inclined downward in the inward direction as viewed in a cross section that is roughly perpendicular to the lower surface and assumes equal angles to both the first side and the second side.

3. The cutting insert according to claim 2, wherein the third surface is a flat plane.

4. The cutting insert according to claim 1, wherein the third surface extends along the cutting edge.

5. The cutting insert according to claim 1, wherein the second surface is extending in a direction along the first side to a position that is spaced from the corner section by a longer distance than a maximum distance to which the first surface and the third surface extend away from the corner section.

6. The cutting insert according to claim 1, wherein a distance between the first surface and the cutting edge as viewed in a top plane view from the upper surface in direction of the lower surface becomes smaller at a higher distance from the corner section.

7. The cutting insert according to claim 1, wherein the second surface comprises:
   a first inclined plane in a region corresponding to the corner section; and
   a second inclined plane located deeper on the inner side and more remote from the corner section than the first inclined plane,
   wherein an inclination angle between the lower surface and the first inclined plane is bigger than an inclination angle between the lower surface and the second inclined plane.

8. The cutting insert according to claim 1, wherein the third surface extends intermittently between the first surface and the second surface.

9. A cutting insert comprising:
   an upper surface;
   a lower surface;
   a first side and a second side meeting at a corner section;
   an inner side defined between the first side, the second side and the corner section and extending in an inward direction from the corner section, the first side and the second side;
   a side surface intersecting with the upper surface and the lower surface;
   a cutting edge comprising a corner cutting edge located at the corner section and where the side surface intersects with the upper surface and comprising a first cutting edge located at the first side;
   a rake face extending along the cutting edge on the upper surface; and
   a protruding portion located deeper on the inner side than the rake face and located on the upper surface, the protruding portion comprising:
      a first surface inclined upward in the inward direction from the cutting edge;
      a second surface that is located on a higher location with respect to the first surface and deeper on the inner side with respect to the first surface and that is inclined upward in the inward direction; and
      a third surface located between the first surface and the second surface, wherein an intersection portion between the first surface and the third surface is inclined downward in the inward direction; wherein the second surface comprises:
      a first inclined plane in a region corresponding to the corner section; and
      a second inclined plane located deeper on the inner side and more remote from the corner section than the first inclined plane,
      wherein an inclination angle between the lower surface and the first inclined plane is bigger than an inclination angle between the lower surface and the second inclined plane.

10. The cutting insert according to claim 9, wherein a length of the first inclined plane in the inward direction and extending away from the corner section is shorter than a length of the second inclined plane in the inward direction and extending away from the corner section.

11. The cutting insert according to claim 9, wherein the third surface is inclined downward in the inward direction as viewed in a cross section that is roughly perpendicular to the lower surface and assumes equal angles to both the first side and the second side.

12. The cutting insert according to claim 11, wherein the third surface is a flat plane.

13. The cutting insert according to claim 9, wherein the third surface extends along the cutting edge.

14. The cutting insert according to claim 9, wherein the second surface is extending in a direction along the first side to a position that is spaced from the corner section by a longer distance than a maximum distance to which the first surface and the third surface extend away from the corner section.

15. The cutting insert according to claim 9, wherein a distance between the first surface and the cutting edge as viewed in a top plane view from the upper surface in direction of the lower surface becomes smaller at a higher distance from the corner section.

16. The cutting insert according to claim 9, wherein the rake face comprises:
   a first rake face extending along the cutting edge; and
   a second rake face located deeper on the inner side in relation to the first rake face and spaced from the corner section with respect to the first surface and the third surface, the second rake face being located between the first rake face and the second surface.

17. The cutting insert according to claim 16, wherein an intersection line along which the third surface meets the second rake face extends at an angle of 90 degree or less with respect to the first side as viewed in a top plane view from the upper surface in direction of the lower surface.

* * * * *